April 15, 1952     J. O. CIERLEY     2,592,657
DEVICE FOR SLICING DOUGH

Filed Jan. 3, 1950     2 SHEETS—SHEET 1

INVENTOR.
JACK OWEN CIERLEY.
BY
G. Ward Kemp
ATTORNEY

April 15, 1952     J. O. CIERLEY     2,592,657
DEVICE FOR SLICING DOUGH
Filed Jan. 3, 1950     2 SHEETS—SHEET 2
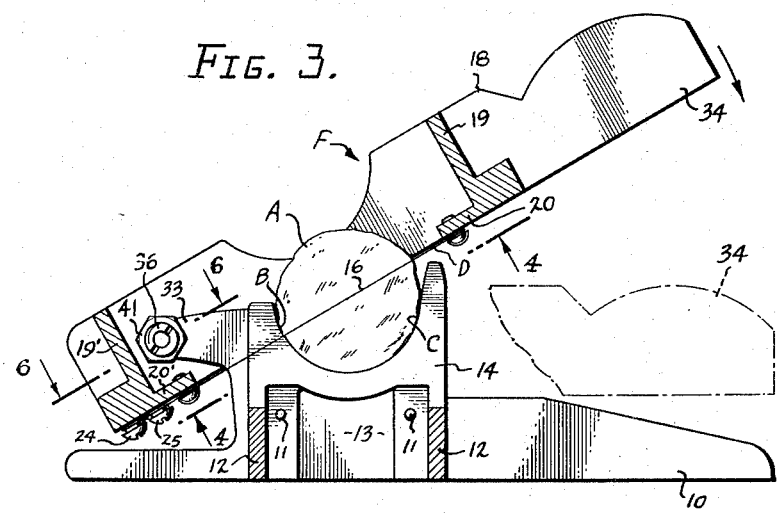
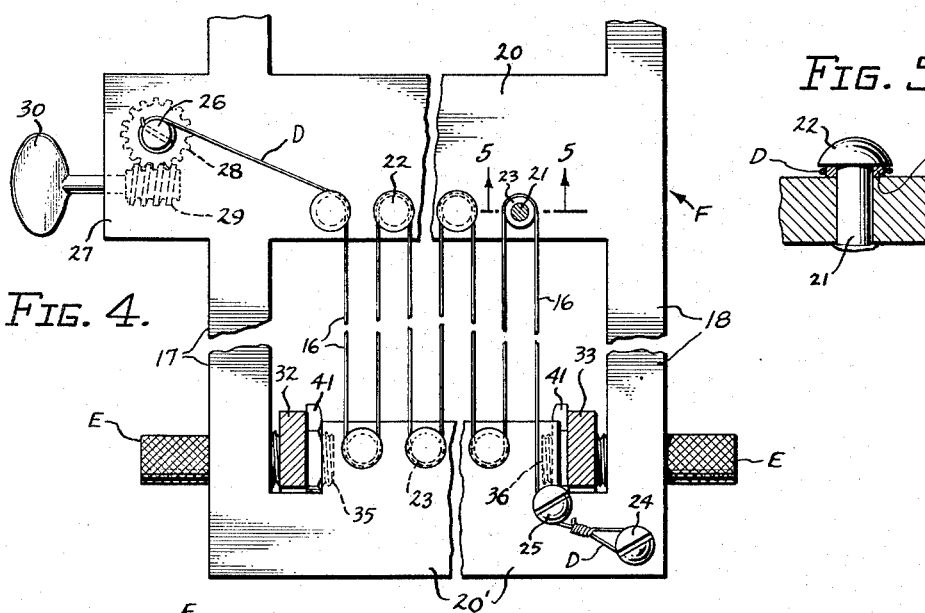
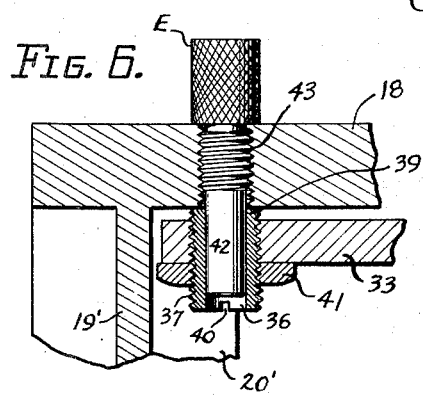
INVENTOR.
JACK OWEN CIERLEY
BY
*F. Ward Kemp*
ATTORNEY.

Patented Apr. 15, 1952

2,592,657

UNITED STATES PATENT OFFICE 2,592,657

DEVICE FOR SLICING DOUGH

Jack Owen Cierley, Seattle, Wash.

Application January 3, 1950, Serial No. 136,454

4 Claims. (Cl. 107—20)

This invention relates to devices for slicing rolls of dough into relatively thin sections for cookies and the like.

In the practice of preparing sections of dough for cookies, it is important that the sections for each cookie be of uniform thickness, to assure even baking, and to facilitate packing and disposal of the finished product. It is also important that in severing a roll of dough into sections for cookies that the cutting edge of the severing member be moved downwardly into the dough and simultaneously drawn backward to provide a slicing movement against the dough and against any raisins, nuts, or other solid objects therein, and thus prevent flattening the roll and to prevent displacing such harder objects therein.

It is therefore an object of this invention to provide mechanical means to meet the foregoing requirements. A particular object is to provide a device having a plurality of curved ribs attached together to provide a cradle for sustaining a roll of dough, and to provide a frame pivotally connected to the cradle having a plurality of relatively fine wires looped across the frame for cutting through the roll of dough and downwardly through slots between the ribs, and further to connect the frame and cradle together by pivots disposed on a plane offset below the plane of the wires, to produce downward and backward movements simultaneously when the frame is depressed for slicing the dough and objects therein, without changing the positions thereof. Further particular objects are to provide such cutting edges by loops of a single wire to and fro across the lower face of the frame and loosely around guide rollers, together with means for adjusting the tension of the loops and means for adjusting with precision the frame and wires laterally for cooperation with the slots between the ribs.

With these and other objects to be hereinafter stated, I have illustratively exemplified my invention by the accompanying drawings, of which Figure 1 is a perspective view of the device with dough in place ready for slicing.

Figure 3 is a section taken on the line 3—3 of Fig. 2 but with the wire frame in semi-elevated position.

Figure 4 is a view taken substantially on the line 4—4 of Fig. 3, showing the disposition of the wire assembly.

Figure 5 is an enlarged sectional view of one of the rivets as taken on the line 5—5 of Fig. 4, showing a collar on the rivet.

Figure 6 is a sectional view of one of the adjustable pivots enlarged, taken on the line 6—6 of Fig. 3.

Figure 1:
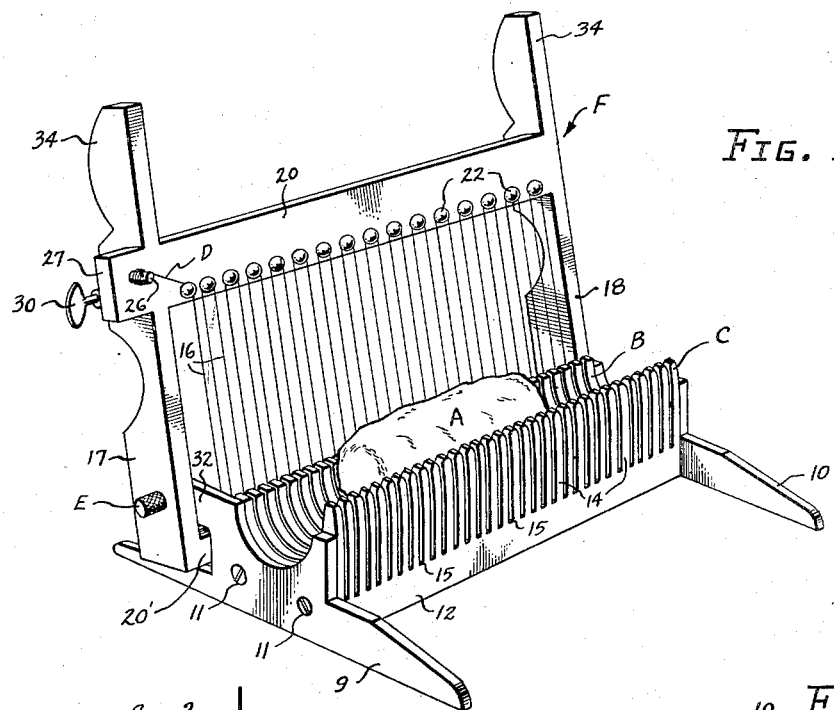
Figure 2:
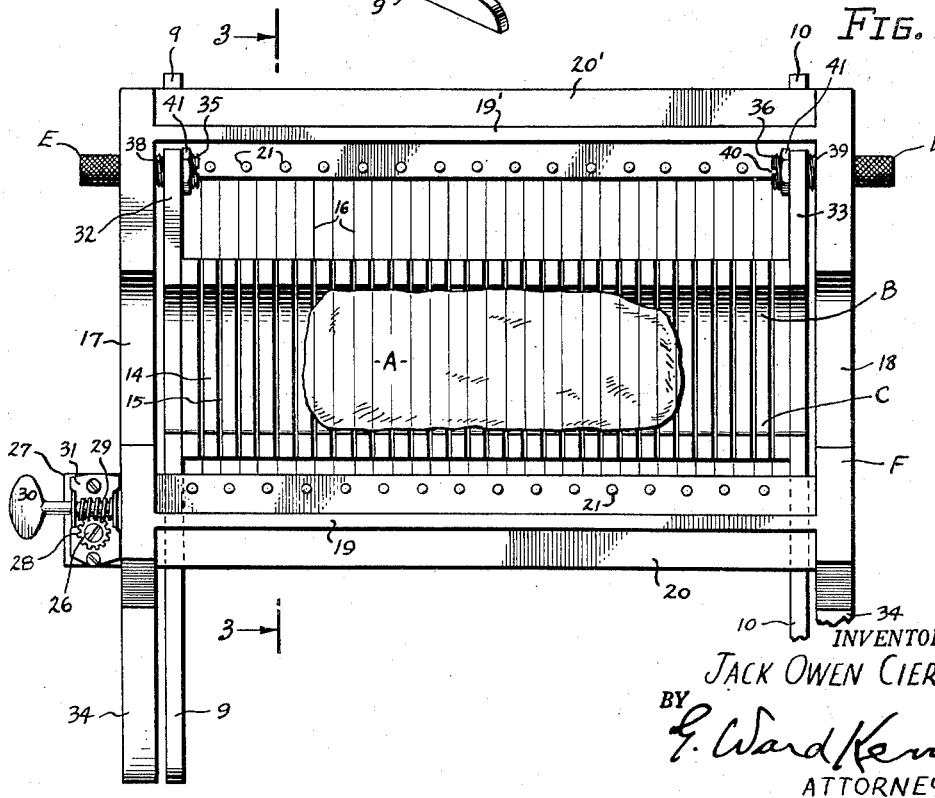
Figure 2 is a top plan view of the device with the cutting frame lowered and the dough sliced.

Like characters on the different figures represent like parts. Numerals 9 and 10 represent respectively opposite ends or heads of the device which are connected in spaced relation for any desired length by screws 11 and a rectangular body 12. The under portion of the body has an open chamber 13 for receiving any waste dough, and the upper face of the body is concaved in shape to provide a cradle for supporting a roll of dough, indicated by A. The rear wall is indicated by B, and the front wall by C. The front wall is preferably relatively higher than the rear, to provide a backing for the dough. Both walls and the bottom of the cradle are divided into a plurality of ribs 14, between which are provided narrow slots 15 for receiving and guiding an equal number of wire sections indicated by 16, for clearness. But in practice all the sections are parts of a single wire D which is relatively very fine, known as number .013 in the trade, for passing downward through the slots, and slicing through the dough in the cradle. The slots are of suitable width to only allow free passage of the wires, and at same time to remove from the wires all or most part of any adhering dough by scraping contact with the ribs on each side of the slots. Any portion not so removed, is carried by the wires completely through the lower portion of the slots down into the chamber and when the wires are next raised any such remainder is scraped from the wires by the ribs and falls into any removable receptacle that may be provided therein. The ribs are of widths desired for thickness of slices of dough for baking.

The wires are raised and lowered for operation by a frame generally indicated by F, comprising end bars 17 and 18 between which are integral rails 19 and 19', having flanges 20 and 20' extending inwardly from the lower edges thereof. A plurality of pins 21 are affixed through the flanges adjacent to the inner edges thereof with caps 22 thereon in spaced relation from the flange to provide for free disposition of the wire between the same. Collars or rollers 23 are rotatively disposed around the shanks of the pins, over which the wires are disposed, and which facilitate the movements of the wires when any one strand meets an obstruction.

One end of the wire D is attached to a binding screw 24 adjacent to one end of one of the flanges, and extends over a guide post 25, and thence looped or strung, around all of the rollers on the pins to and fro between the flanges to provide the cutting sections indicated by 16. The collars preferably have diameters slightly exceeding the widths of the ribs, to align the wires with the slots. The opposite end of the wire is attached to a spindle 26 which is rotatably disposed through a lug 27 on the end of the opposite flange, and has affixed on the top thereof a pinion 28, in which meshes a worm thread 29 on a winding key 30 for adjusting the tension of the wires 16. The key is operatively supported on a bracket plate 31 affixed to the lug. In operation the looped wires are sufficiently loose to permit any one strand to bow backward or give slightly and slide around laterally when a relatively hard substance may be encountered in the dough thereby. This bowing is facilitated by the freely turning rollers on the pins and tends to prevent the breaking of the wire at any point when one section of the wire is so obstructed. Ordinarily all the sections automatically assume equal tension for cutting through the dough.

In order to provide operative and reciprocating movements of the wires, when the frame is raised and lowered by the handles 34, pivots generally indicated as E are disposed between the ends of the base and the ends of the frame. Ears 32 and 33 are extended backward from the top of the wall B at the ends thereof, for fulcrums, through which tubular sleeves 35 and 36 are adjustably supported by their threads 37. The outer ends of the sleeves as 38 and 39 are projected from the outer sides of the ears sufficiently to abut against the inner faces of the base tops, and may be adjusted by screw driver indents 40 to accurately align the wires for passage between the ribs and may be locked in position by jamb nuts 41. The pivots are provided with threads 43 which mesh in the cross bars 17 and 18 of the frame, and the inner ends 42 of the pivots are smooth and fit within the sleeves which rotate thereon when the handle is operated. The pivotal sleeves are located in spaced relation relatively higher than the level or the plane of the flanges, or offset eccentrically in relation therewith, so that when the handle is elevated the flange 20' is brought up near the top of the rear wall, and then when the handle is lowered the wires 16 are carried downward and backward, producing a slicing movement through the dough simultaneously with the pressing movement.

It will also be understood that when attempts have been made to use wires for severing soft substances, such wires being held rigidly, that if a relatively hard portion of the substance or a relatively harder object was encountered by any one of such wires, that the result was a broken wire. In my structure where one wire is wound to and fro between flanges and over loose rollers, and not drawn rigidly, such wires instead of snapping or breaking when such hard object is encountered by one section, will each contribute to looseness of the obstructed wire and enable the same to bend or bow backward, and then slide around the edge of any such hard object, and thereupon all the wire sections will assume equal tension or looseness, for continued cutting or severing the dough.

It will be understood that the bending or bowing of any of the wire loops because of contact with a hard object or relatively harder portion of the substance to be cut, that all of the loops will shift positions and move longitudinally and produce a sawing contact on the substance, and greatly facilitate the severing or cutting of the substances when the wires are swung downwardly by the frame.

Having described my invention I claim as new:

1. A device for cutting dough for cookies and the like, comprising a pair of end members, a rectangular body extended between and attached at the ends thereof to the respective bases, the upper portion of the body being divided into a plurality of relatively narrow ribs concaved crosswise over the body to provide a cradle for rolls of dough and being spaced apart by slots for passage of wires therethrough for cutting the dough in sections of equal widths as the ribs, ears extended backward from the upper rear corners of the body for fulcrums, a rectangular frame for operation over the cradle, pivots extended through the upper rear corners of the frame and rotatably disposed in the fulcrums, flanges along opposite lower margins of the frame provided with a plurality of pins affixed thereto, rollers freely disposed around the pins having diameters slightly exceeding the widths of the ribs for supporting loops of a wire, a wire connected at each end thereof to one of the respective ends of the oppositely disposed flanges and the bight of the wire between its ends, extended in strands to and fro between and around the said rollers for cutting crosswise through rolls of dough in the cradle when the frame is pressed forwardly and downwardly over the slots, the said loops of the wire being relatively loose around and between the respective rollers, to provide a reciprocating lengthwise movement of the strands of the wires simultaneously with downward movement thereof for sawing through the dough and sliding around relatively harder objects therein when the frame is swung downwardly.

2. Structure described in claim 1, together with relatively wide caps affixed on the tops of the pins for guards for the loops of the wire and to prevent shifting the positions of the loops from or over the tops of the rollers when any one of sections between the flanges meets with abnormally increased resistance in the dough.

3. A device for slicing dough for cookies and the like, including a pair of bars spaced apart for a base, an elongated body affixed between the bars and being concaved along the upper face thereof for a cradle for supporting a roll of dough, and having a plurality of ribs crosswise spaced apart for slots for guiding cutting wires, an elongated frame for operation over the cradle having a plurality of sections of a wire connected to and between the lower margins of the frame, rollers rotatively disposed on said margins for aligning the wire sections with the slots, and said wire sections being loosely disposed around and between the respective pairs of rollers to facilitate bending of the respective strands of the wire sections between the rollers on contact with a relatively hard object in the dough, and to promote longitudinal shifting of the remainder of the strands when one is obstructed by extraordinary resistance and to produce a sawlike action of the strands for severing the dough when the frame is swung downward over the body.

4. Structure described in claim 3, together with flanges extended longitudinally along the bottom of the frame, a plurality of pins carried by the flanges, said rollers being rotatably disposed over the pins for supporting loops of the wires, to facilitate movement of all of the sections of wire to prevent the breaking of any one of the sections when obstructed by a relatively hard object in the dough, and to facilitate the passing of the obstructed wire laterally around the obstruction.

JACK OWEN CIERLEY.

REFERENCES CITED

The following references are of record in the file of this patent:

UNITED STATES PATENTS

| Number | Name | Date |
|---|---|---|
| 553,434 | Sigmund | Jan. 21, 1896 |
| 1,331,786 | Ruttle | Feb. 24, 1920 |

FOREIGN PATENTS

| Number | Country | Date |
|---|---|---|
| 1,931 | Great Britain | May 18, 1911 |